(No Model.)

E. A. & E. W. GERBRACHT.
CHILD'S CARRIAGE.

No. 314,327. Patented Mar. 24, 1885.

WITNESSES:
Chas. Niven
C. Sedgwick

INVENTOR:
E. A. Gerbracht
E. W. Gerbracht
BY Munn & Co.
ATTORNEYS.

UNITED STATES PATENT OFFICE.

EUGÈNE A. GERBRACHT, OF NEW YORK, AND ERNEST W. GERBRACHT, OF BROOKLYN, N. Y.

CHILD'S CARRIAGE.

SPECIFICATION forming part of Letters Patent No. 314,327, dated March 24, 1885.

Application filed October 2, 1884. (No model.)

*To all whom it may concern:*

Be it known that we, ERNEST W. GERBRACHT, of Brooklyn, E. D., in the county of Kings and State of New York, and EUGÈNE A. GERBRACHT, of the city, county, and State of New York, have invented a new and useful Improvement in Baby-Carriages and other Vehicles, of which the following is a full, clear, and exact description.

Reference is to be had to the accompanying drawings, forming a part of this specification, in which similar letters of reference indicate corresponding parts in all the figures.

Figure 1:
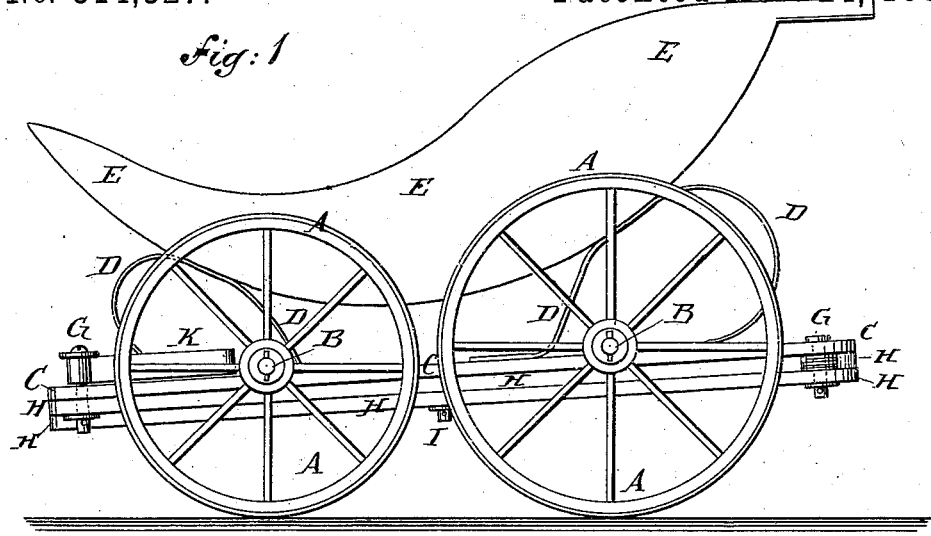
Figure 2:
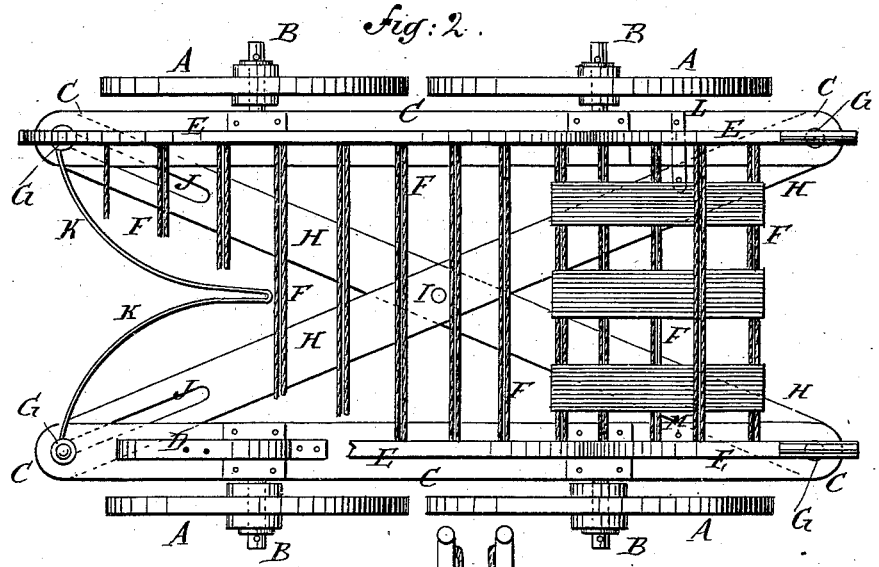
Figure 3:
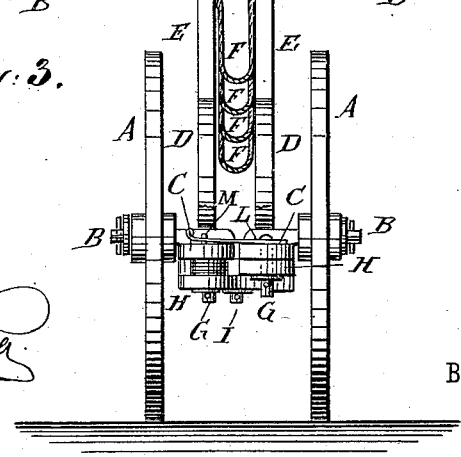

Figure 1 is a side elevation of a baby-carriage to which our improvement has been applied. Fig. 2 is a plan view of the same, part being broken away. Fig. 3 is a rear elevation of the same folded.

The object of this invention is to provide baby-carriages, sleighs, and other vehicles constructed in such a manner that they can be folded together to adapt them to be readily taken through doorways and other narrow spaces and to be stored in small space.

The invention relates to a vehicle constructed with side bars which are connected by pivoted diagonal bars and a spring. To the side bars are attached the short axles of the wheels, and the side parts of the body, which parts are connected by a flexible connection. The parts of the vehicle are held in place, when folded, by a fastening, as will be hereinafter described and claimed.

A represents the wheels of a baby-carriage, the short axles B of which are attached to side bars, C.

To the bars C are attached bent or other shaped springs D, to which are secured the side parts, E, of the carriage-body. The side parts, E, of the carriage-body are connected by cords F, cloth, leather, or other suitable flexible material, so that the said side parts can be brought close together, as shown in Fig. 3.

To the forward and rear ends of the side bars, C, are pivoted by bolts G the ends of the diagonal bars H, which cross each other at their centers, and are pivoted together by a bolt, I.

In the forward ends of the diagonal bars H are formed longitudinal slots J, to receive the forward pivoting-bolts G, so that the side bars, C, and the diagonal bars H can be folded together compactly.

The bars C H are held in place, when expanded, by a V-spring, K, or other shaped spring, attached to the forward pivoting-bolts G or other suitable support; or the bars C H can be held apart by jointed bars, rigid bars, or other suitable means. The bars C H are held in place, when folded, by a spring-catch, L, attached to one of the side bars, C, and engaging with a pin, M, attached to the other side bar, or by other suitable means.

We have described our improvement as applied to baby-carriages, but do not limit ourselves to that application, as it can be used with advantage upon sleighs and other vehicles.

We are aware that the sides of a carriage-body have been provided with a flexible bottom an back and with a lazy-tongs connecting the back portion of the sides. The sides were provided with longitudinal springs on which short axles were mounted, said axles being connected by lazy-tongs, and we do not claim such as of our invention.

Having thus described our invention, we claim as new and desire to secure by Letters Patent—

1. A vehicle constructed, substantially as herein shown and described, in two parts, connected by pivoted diagonal bars, and held apart by a spring, as set forth.

2. In a vehicle, the combination, with the side bars, C, of the wheels and short axles A B, the bars H, crossed at their centers and pivoted at their ends to the opposite ends of the side bars, and a spring, K, between said side bars, substantially as herein shown and described, whereby the said vehicle can be readily folded, as set forth.

3. In a vehicle, the combination, with the wheels and short axles A B, the side bars, C, on which the axles are journaled, the bars H, crossed at their centers and pivoted to the opposite ends of the side bars, and the spring K between said side bars, of the body E, made in two parts, longitudinal springs D, secured to said parts E and to the side bars, C, and the flexible connections F, substantially as herein shown and described, whereby the said body will be folded by and with the running part of the vehicle, as set forth.

4. In a vehicle, the combination, with the side bars, C, and the pivoted diagonal bars H, of the spring-catch L on one side bar and pin M on the other, for said catch to engage, substantially as herein shown and described, whereby the parts of the vehicle will be held in place when folded, as set forth.

EUGENE A. GERBRACHT.
ERNEST W. GERBRACHT.

Witnesses:
WILLIAM REMSEN MULFORD,
C. SEDGWICK.